(12) United States Patent
Mori

(10) Patent No.: US 10,316,978 B2
(45) Date of Patent: Jun. 11, 2019

(54) TIRE VALVE UNIT

(71) Applicant: PACIFIC INDUSTRIAL CO., LTD., Ogaki-shi, Gifu-ken (JP)

(72) Inventor: Hirotake Mori, Ogaki (JP)

(73) Assignee: PACIFIC INDUSTRIAL CO., LTD., Gifu-Ken (JP)

( * ) Notice: Subject to any disclaimer, the term of this patent is extended or adjusted under 35 U.S.C. 154(b) by 73 days.

(21) Appl. No.: 15/316,703

(22) PCT Filed: Feb. 3, 2016

(86) PCT No.: PCT/JP2016/053253
§ 371 (c)(1),
(2) Date: Dec. 6, 2016

(87) PCT Pub. No.: WO2017/134777
PCT Pub. Date: Aug. 10, 2017

(65) Prior Publication Data
US 2018/0038500 A1 Feb. 8, 2018

(51) Int. Cl.
*F16K 15/20* (2006.01)
*B60C 29/02* (2006.01)
(Continued)

(52) U.S. Cl.
CPC .............. *F16K 15/20* (2013.01); *B60C 23/04* (2013.01); *B60C 23/0494* (2013.01);
(Continued)

(58) Field of Classification Search
CPC .. F16K 15/20; F16K 37/005; Y10T 137/3662; Y10T 137/3677;
(Continued)

(56) References Cited

U.S. PATENT DOCUMENTS

| 3,442,316 A | 5/1969 | McMaster |
| 7,870,866 B2 * | 1/2011 | Yu .................... B60C 23/0408 137/227 |

(Continued)

FOREIGN PATENT DOCUMENTS

| CN | 201287595 Y | 8/2009 |
| DE | 102012105249 A1 | 12/2013 |

(Continued)

OTHER PUBLICATIONS

Communication includes the extended Supplementary European Search Report, dated Jan. 23, 2018, during the prosecution of the corresponding European patent application No. 16804679.5, 10 pages.

(Continued)

*Primary Examiner* — Craig J Price
(74) *Attorney, Agent, or Firm* — Cantor Colburn LLP

(57) ABSTRACT

A tire valve unit includes a tire valve and a sensor unit. The tire valve includes a valve stem and a rubber body located on the periphery of the valve stem. The sensor unit includes a sensor mounted on a wheel and a housing that accommodates the sensor and is secured to the tire valve. The tire valve unit is mounted on the wheel by press-fitting the tire valve into a mounting hole in the wheel. The body includes an attaching portion. The tire valve includes an attaching projection that projects in the axial direction of the tire valve from the inside of the attaching portion toward the outside. The tire valve unit further includes a fixture that secures the attaching projection to the housing.

5 Claims, 5 Drawing Sheets

(51) Int. Cl.
 *B60C 23/04* (2006.01)
 *F16K 37/00* (2006.01)
(52) U.S. Cl.
 CPC ............ *B60C 29/02* (2013.01); *F16K 37/005* (2013.01); *Y10T 137/3662* (2015.04); *Y10T 137/3693* (2015.04)
(58) Field of Classification Search
 CPC .......... Y10T 137/3693; B60C 23/0494; B60C 23/04; B60C 29/02
 USPC ......... 137/227–229; 73/146–146.8; 152/427, 152/429, DIG. 11
 See application file for complete search history.

(56) References Cited

U.S. PATENT DOCUMENTS

| | | | | |
|---|---|---|---|---|
| 8,474,475 | B2* | 7/2013 | Palaoro | B60C 23/0408 137/227 |
| 9,475,350 | B2* | 10/2016 | Lo | B60C 23/0494 |
| 2003/0079537 | A1* | 5/2003 | Luce | B60C 23/0408 73/146 |
| 2003/0209065 | A1* | 11/2003 | Fonteneau | B60C 23/0408 73/146.8 |
| 2006/0125612 | A1* | 6/2006 | Okubo | B60C 23/0408 340/445 |
| 2006/0288924 | A1* | 12/2006 | Katou | B60C 23/0408 116/34 R |
| 2007/0062268 | A1* | 3/2007 | Blossfeld | B60C 23/0408 73/146.8 |
| 2007/0180901 | A1* | 8/2007 | Katou | B60C 23/0408 73/146.2 |
| 2008/0202659 | A1* | 8/2008 | Hettle | B60C 23/0408 152/415 |
| 2009/0007649 | A1 | 1/2009 | Kempf et al. | |
| 2010/0024539 | A1 | 2/2010 | Hamm et al. | |
| 2015/0375582 | A1* | 12/2015 | Chen | B60C 23/0452 152/427 |

FOREIGN PATENT DOCUMENTS

| | | |
|---|---|---|
| JP | 2007153298 A | 6/2007 |
| JP | 2013244747 A | 9/2013 |
| JP | 2014008935 A | 1/2014 |
| JP | 201542543 A | 3/2015 |

OTHER PUBLICATIONS

International Search Report, PCT/JP2016/053253, dated Feb. 3, 2016, pp. 2.

* cited by examiner

TIRE VALVE UNIT

TECHNICAL FIELD

The present invention relates to a tire valve unit.

BACKGROUND ART

Conventionally, tire condition monitoring apparatuses have been known that monitor the condition of a tire such as the air pressure of the tire. A tire valve unit used in such a tire condition monitoring apparatus includes a tire valve and a sensor unit, which is secured to the tire valve. The tire valve unit is mounted on a wheel by press-fitting the tire valve into a mounting hole in the wheel (for example, see Patent Document 1).

In the above-mentioned tire valve unit, as shown in FIG. 10, a sensor unit 101 includes a housing 102, which accommodates a sensor that detects a condition of the tire. The housing 102 also includes a fitting groove 103 in which a nut 104 is embedded.

The tire valve 110 includes a tubular valve stem 111 and a rubber body 112, which is located on the outer circumferential surface of the valve stem 111. Part of the valve stem 111 projects from the body 112. A coupling portion 113, which projects from the body 112, includes an insertion hole 114, which extends through the coupling portion 113 in a radial direction. A bolt 115, which is inserted in the insertion hole 114, is screwed to the nut 104 to integrate the tire valve 110 with the sensor unit 101.

The end of the tire valve 110 in the axial direction to which the sensor unit 101 is not secured is referred to as a first axial end 110a. The tire valve 110 is inserted in a mounting hole 121 in a wheel 120 from the first axial end 110a to mount the tire valve unit on the wheel 120. When part of the body 112 of the tire valve 110 the outer diameter of which is greater than the diameter of the mounting hole 121 reaches the mounting hole 121, the body 112 is elastically deformed in a stretching manner in the axial direction of the tire valve 110. Since the tire valve 110 is inserted in the mounting hole 121 from the first axial end 110a, reaction force toward a second axial end 110b acts on the tire valve 110 from the peripheral portion of the mounting hole 121 in the wheel 120. Thus, part of the body 112 located inside the wheel 120 is elastically deformed in a stretching manner toward the second axial end 110b.

If the body 112 and the sensor unit 101 are in close contact with each other, the elastic deformation of the body 112 is prevented by the sensor unit 101, and the tire valve unit may be hard to mount on the wheel 120. Thus, in the tire valve unit disclosed in Patent Document 1, a gap 130 is provided between the body 112 and the housing 102 of the sensor unit 101 to keep a space for allowing for elastic deformation of the body 112.

PRIOR ART DOCUMENT

Patent Document

Patent Document 1: Japanese Laid-Open Patent Publication No. 2013-244747.

SUMMARY OF THE INVENTION

Problems that the Invention is to Solve

The greater the gap 130 between the body 112 and the sensor unit 101, the closer the center of gravity of the tire valve unit becomes to the second axial end 110b. When the wheel 120 is rotated, centrifugal force acts on the tire valve unit. The centrifugal force pushes the body 112 against the inner surface of the mounting hole 121, causing stress on the body 112. The farther the center of gravity of the tire valve unit from the mounting hole 121, the greater the stress generated on the body 112 becomes and the more likely the body 112 is to deteriorate.

Accordingly, it is an objective of the present invention to provide a tire valve unit that retards deterioration of the body.

Means for Solving the Problems

To achieve the foregoing object and in accordance with one aspect of the present invention, a tire valve unit that includes a tire valve and a sensor unit is provided. The tire valve includes a valve stem and a rubber body located on a periphery of the valve stem. The tire valve includes a first axial end and a second axial end. The sensor unit includes a sensor that detects a condition of a tire mounted on a wheel and a housing that accommodates the sensor. The sensor unit is secured to the tire valve. The tire valve unit is mounted on the wheel by press-fitting the tire valve into a mounting hole in the wheel from the first axial end. The body includes an opposed portion that is opposed to an inner surface of the mounting hole with the tire valve unit mounted on the wheel, a proximal end portion located closer to the second axial end of the tire valve than the opposed portion, and an attaching portion including the opposed portion and the proximal end portion. The tire valve includes an attaching projection that projects in the axial direction of the tire valve from the inside of the attaching portion toward the outside of the attaching portion. The tire valve unit further includes a fixture that secures the attaching projection to the housing.

To mount the tire valve unit on the wheel, the tire valve is inserted in the mounting hole from the first axial end, and when part of the body of the tire valve that has an outer diameter greater than the diameter of the mounting hole approaches the mounting hole, the body is press-fitted into the mounting hole. The body receives force toward the second axial end from the peripheral portion of the mounting hole in the wheel. This force elastically deforms the body in a stretching manner toward the second axial end. Part of the body that receives force from the wheel and a section closer to the second axial end than this part is elastically deformed in a stretching manner toward the second axial end 30b. The attaching portion of the body is the part that is stretched toward the second axial end to mount the tire valve unit on the wheel.

The attaching projection is incorporated in the attaching portion of the body and projects outside the attaching portion. Thus, when the attaching portion is elastically deformed in a stretching manner toward the second axial end, the attaching projection moves toward the second axial end, following the attaching portion, and the sensor unit, which is secured to the attaching projection, also moves with the attaching projection. As a result, the sensor unit moves toward the second axial end by an amount corresponding to the amount by which the body has been stretched toward the second axial end. Thus, the sensor unit is restrained from preventing the elastic deformation of the body toward the second axial end. It is unnecessary to provide a gap between the body and the sensor unit to accommodate elastic deformation of the body in a stretching manner toward the second axial end. The body and the sensor unit thus can be arranged close to each other. This structure allows the center of gravity of the tire valve unit to be close to the opposed portion. Thus, the stress generated on the body by the centrifugal force is reduced, which retards deterioration of the body.

In the above described tire valve unit, the housing includes an attaching wall including an attaching hole. The attaching projection is inserted through the attaching hole and includes a groove at a part of the attaching projection that projects from the attaching wall, and the fixture is fitted to the groove.

With this structure, by fitting the fixture to the groove, the attaching projection is prevented from falling out of the attaching hole. Since the sensor unit is secured to the tire valve by fitting the fixture to the groove, the tire valve and the sensor unit are easily coupled to each other.

To achieve the foregoing objective and in accordance with another aspect of the present invention, a tire valve unit that includes a tire valve and a sensor unit is provided. The tire valve includes a valve stem and a rubber body located on a periphery of the valve stem. The tire valve includes a first axial end and a second axial end. The sensor unit includes a sensor that detects a condition of a tire mounted on a wheel and a housing that accommodates the sensor, and the sensor unit is secured to the tire valve. The tire valve unit is mounted on the wheel by press-fitting the tire valve into a mounting hole in the wheel from the first axial end. The body includes an opposed portion that is opposed to an inner surface of the mounting hole with the tire valve unit mounted on the wheel, a proximal end portion located closer to the second axial end of the tire valve than the opposed portion, and an attaching portion including the opposed portion and the proximal end portion. The tire valve includes a first threaded member incorporated in the attaching portion. The tire valve unit further includes a second threaded member that is inserted in a through-hole in the housing and is screwed to the first threaded member.

With this structure, since the first threaded member is incorporated in the attaching portion, when the attaching portion is elastically deformed in a stretching manner toward the second axial end, the first threaded member moves toward the second axial end, following the attaching portion, and the sensor unit and the second threaded member also move together with the first threaded member. It is unnecessary to provide a gap between the body and the sensor unit to accommodate elastic deformation of the body in a stretching manner toward the second axial end. The body and the sensor unit thus can be arranged close to each other. With this structure, since the center of gravity of the tire valve unit is located close to the opposed portion, the stress generated on the body by the centrifugal force is reduced, which retards deterioration of the body.

Effects of the Invention

The present invention retards deterioration of the body.

MODES FOR CARRYING OUT THE INVENTION

First Embodiment

A tire valve unit 10 according to a first embodiment will now be described.

Figure 1:
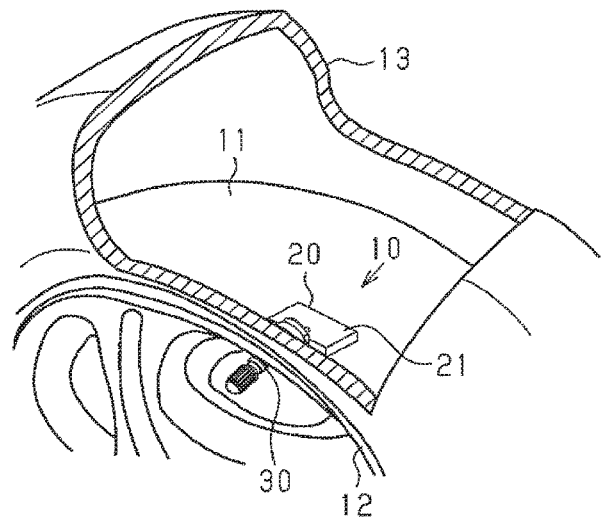
FIG. 1 is a perspective view of a tire valve unit according to a first embodiment mounted on a wheel.
Figure 2:
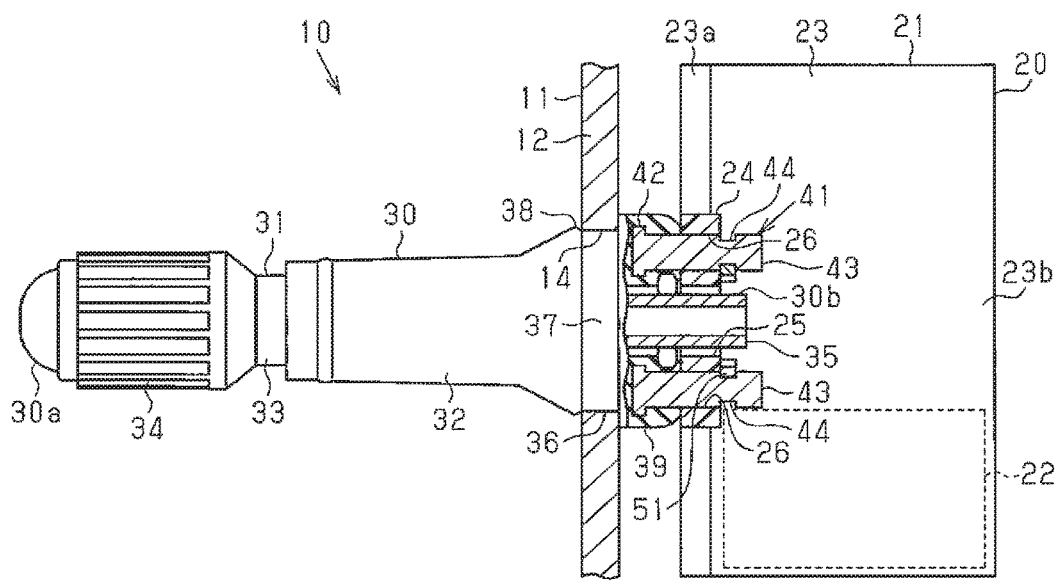
FIG. 2 is a partially cut-away view of the tire valve unit according to the first embodiment mounted on the wheel.

As shown in FIGS. 1 and 2, the tire valve unit 10 includes a tire valve 30, which is mounted on a rim 12 of a wheel 11, and a sensor unit 20, which is secured to the tire valve 30 and is arranged inside a tire 13 mounted on the wheel 11. The tire valve unit 10 is mounted on the wheel 11 by press-fitting the tire valve 30 into a mounting hole 14 in the wheel 11.

The sensor unit 20 will now be described.

Figure 3:
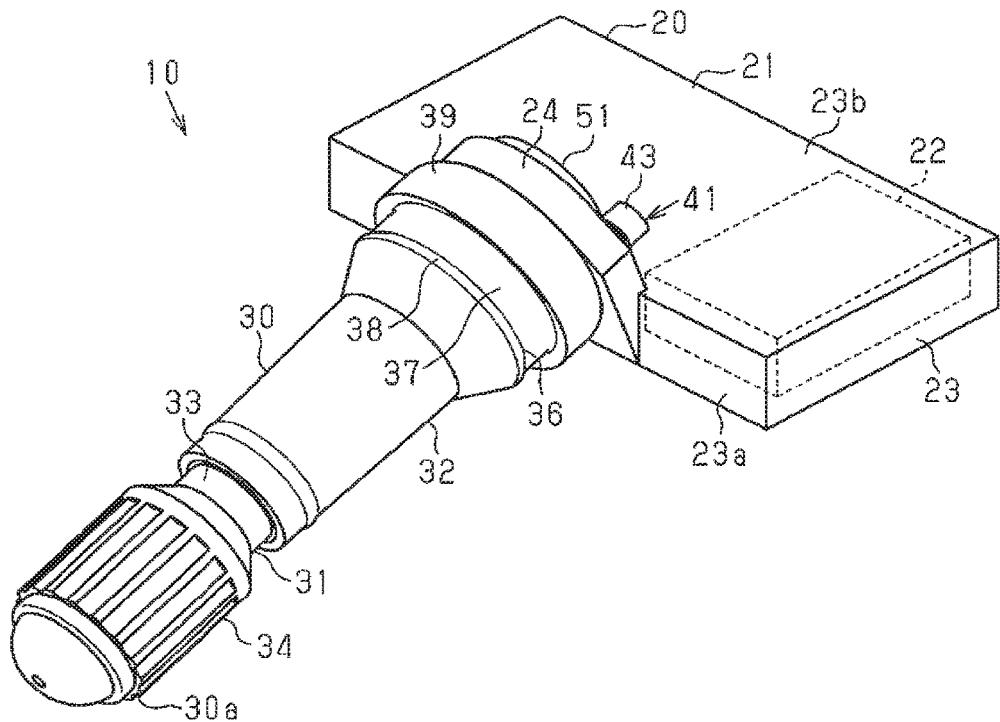
FIG. 3 is a perspective view of the tire valve unit according to the first embodiment.
Figure 4:
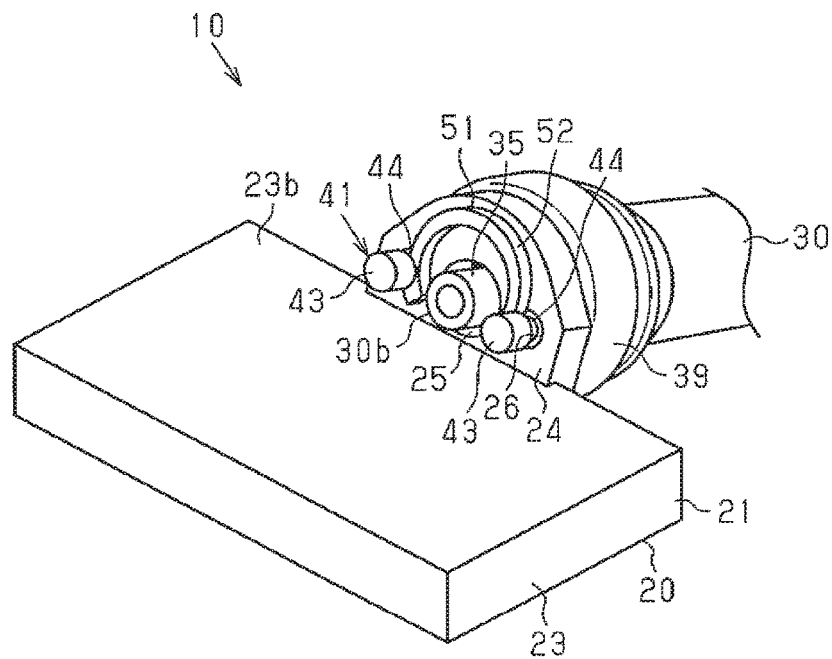
FIG. 4 is an enlarged perspective view of a second axial end of the tire valve unit according to the first embodiment.

As shown in FIGS. 3 and 4, the sensor unit 20 includes a housing 21 and a sensor 22, which is accommodated in the housing 21. The sensor 22 may be, for example, a pressure sensor that detects the air pressure in the tire 13 or a temperature sensor that detects the temperature in the tire 13. The housing 21 also accommodates, together with the sensor 22, a battery (not shown) that serves as a power source of the sensor 22 and a transmitting circuit (not shown) that transmits data indicating the detected condition of the tire (the air pressure of the tire and the temperature in the tire) to a receiver mounted on the vehicle.

Figure 5:
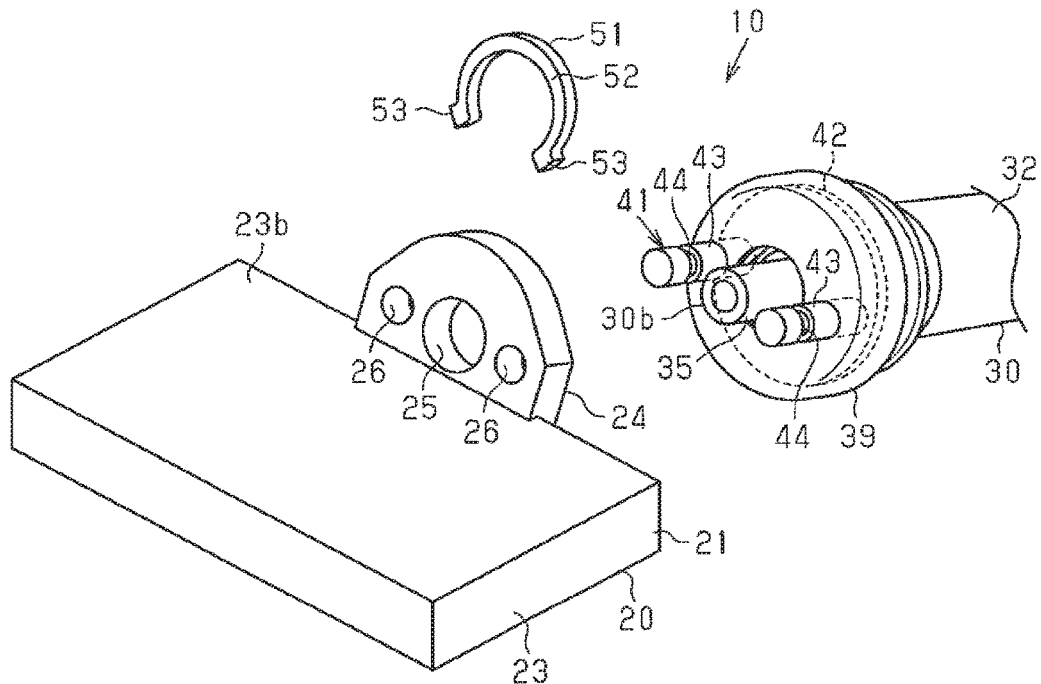
FIG. 5 is an exploded perspective view of the tire valve unit according to the first embodiment.

As shown in FIGS. 3 and 5, the housing 21 includes a rectangular box-like main body 23, which accommodates the sensor 22, and an attaching wall 24, which is located on one of the outer surfaces, or an outer surface 23a, of the main body 23. The main body 23 has two outer surfaces that have the largest area. One of these two outer surfaces is referred to as an outer surface 23b, and one of the outer surfaces orthogonal to the outer surface 23b is referred to as the outer surface 23a.

The attaching wall 24 projects from the outer surface 23a in the lateral direction of the outer surface 23a in a state in which the attaching wall 24 is inclined with respect to the outer surface 23a, on which the attaching wall 24 is provided. The attaching wall 24 includes a valve hole 25, which extends through the attaching wall 24 in the thickness direction. The attaching wall 24 also includes two attaching holes 26 that extend through the attaching wall 24 in the thickness direction arranged to sandwich the valve hole 25.

The tire valve 30 will now be described.

As shown in FIGS. 2 and 3, the tire valve 30 includes a metal valve stem 31 and a rubber body 32, which is located on the periphery of the valve stem 31. The valve stem 31 and the body 32 are both cylindrical. The valve stem 31 includes a non-illustrated introduction passage. The valve stem 31 includes a first projection 33 and a second projection 35, each projecting from either end of the body 32 in the axial direction. A cap 34 is fitted to the first projection 33 of the valve stem 31. In the following description, a first axial end 30a of the tire valve 30 is on the same side as the first projection 33 of the tire valve 30 in the axial direction, and a second axial end 30b of the tire valve 30 is on the same side as the second projection 35 of the tire valve 30 in the axial direction.

The body 32 includes a mounting portion 37, in which a mounting groove 36 is formed along the entire outer circumferential surface. When the tire valve unit 10 is not mounted on the wheel 11, the outer diameter of the mounting portion 37 is greater than the diameter of the mounting hole 14. The body 32 includes an engaging portion 38 and a proximal end portion 39, which are arranged to sandwich the mounting portion 37 in the axial direction. The engaging portion 38 is located between the mounting portion 37 and the first axial end 30a and is continuous with the mounting portion 37. The outer diameter of the engaging portion 38 is greater than the outer diameter of the mounting portion 37. The proximal end portion 39 is located between the mounting portion 37 and the second axial end 30b and is continuous with the mounting portion 37. The outer diameter of the proximal end portion 39 is greater than the outer diameter of the mounting portion 37. The outer diameter of part of the body 32 closer to the first axial end 30a than the engaging portion 38 is smaller than the diameter of the mounting hole 14.

In a state in which the tire valve unit 10 is mounted on the wheel 11, the mounting portion 37 is opposed to the inner surface of the mounting hole 14. Thus, the mounting portion 37 serves as an opposed portion, and the mounting portion 37 and the proximal end portion 39, which is the part of the body 32 closer to the second axial end 30b than the mounting portion 37, serve as an attaching portion. The attaching portion may also be referred to as the part of the body 32 closer to the second axial end 30b than the part located outside the tire 13 in a state in which the tire valve unit 10 is mounted on the wheel 11.

As shown in FIG. 5, the tire valve 30 includes an attaching member 41. The attaching member 41 includes a support portion 42 incorporated in the proximal end portion 39 and two attaching projections 43, which are integrally formed with the support portion 42 and extend from the support portion 42. The support portion 42 is annular and coaxial with the tire valve 30. The valve stem 31 extends through the center of the support portion 42. The attaching projections 43 are columnar. The axial direction of the attaching projections 43 agrees with the axial direction of the tire valve 30. The attaching projections 43 project from the support portion 42 in the axial direction of the tire valve 30 toward the second axial end 30b, that is, toward the outside of the proximal end portion 39. In other words, the attaching projections 43 project from the inside of the attaching portion toward the outside of the attaching portion. Each attaching projection 43 includes a groove 44 at a section protruding outside the proximal end portion 39. Each groove 44 extends along the entire circumference of the associated attaching projection 43.

As shown in FIG. 4, the sensor unit 20 is secured to the second axial end 30b of the above-described tire valve 30. The second projection 35 of the valve stem 31 is inserted in the valve hole 25 of the attaching wall 24. The attaching projections 43 of the attaching member 41 are inserted in the attaching holes 26 of the attaching wall 24. The grooves 44 of the attaching projections 43 are located on the opposite side of the attaching wall 24 with respect to the body 32. The shortest distance between the body 32 and the grooves 44 in the axial direction of the tire valve 30 is greater than or equal to the thickness of the attaching wall 24.

The tire valve unit 10 includes a fixture (or a retaining ring) 51. The fixture 51 is fitted to the grooves 44 of the attaching projections 43 to prevent the attaching projections 43 from falling out of the attaching holes 26. The fixture 51 includes a C-shaped main body 52 and hooks 53 provided on the ends of the main body 52. The fixture 51 is made of metal and is elastically deformable such that the ends of the main body 52 approach each other. The ends of the main body 52 are inserted between the attaching projections 43. Fitting the ends of the main body 52 and the hooks 53 into the grooves 44 prevents the fixture 51 from moving in the axial direction of the tire valve 30. Furthermore, engaging the hooks 53 with the respective grooves 44 prevents the fixture 51 from moving in the radial direction of the tire valve 30.

When force is applied to the tire valve 30 in a direction in which the attaching projections 43 are made to fall out of the attaching holes 26, the abutment of the fixture 51 with the attaching wall 24 prevents the attaching projections 43 from falling out of the attaching holes 26. In the tire valve unit 10, the proximal end portion 39 of the body 32 and the attaching wall 24 of the housing 21 are in close contact with each other in the axial direction of the tire valve 30.

Operation of the tire valve unit 10 according to the present embodiment will now be described.

To mount the tire valve unit 10 on the wheel 11, the tire valve 30 is inserted in the mounting hole 14 from the first axial end 30a. When part of the body 32 that has an outer diameter greater than the diameter of the mounting hole 14 (in the present embodiment, the engaging portion 38) approaches the mounting hole 14, the body 32 is elastically deformed in the axial direction and is press-fitted into the mounting hole 14.

When the body 32 is press-fitted into the mounting hole 14, the body 32 is pressed against the peripheral portion of the mounting hole 14 in the wheel 11, and force acts on the peripheral portion of the mounting hole 14 in the wheel 11 toward the first axial end 30a. Reaction force to this force applies force to the body 32 toward the second axial end 30b. Since the body 32 acts to recover its original shape in the mounting hole 14, the outer circumferential surface of the body 32 is pressed against the inner surface of the mounting hole 14. Thus, frictional force is generated at the interface between the inner surface of the mounting hole 14 and the outer circumferential surface of the body 32. The frictional force applies force to the body 32 toward the second axial end 30b.

Thus, when the part of the body 32 that has an outer diameter greater than the diameter of the mounting hole 14 is press-fitted into the mounting hole 14, the part of the body 32 that receives force from the wheel 11 and a section of the body 32 closer to the second axial end 30b than this part is elastically deformed in a stretching manner toward the second axial end 30b. In the process of mounting the tire valve unit 10 on the wheel 11, the engaging portion 38 and the entire part of the body 32 closer to the second axial end 30b than the engaging portion 38 is elastically deformed in a stretching manner toward the second axial end 30b.

In the present embodiment, since the support portion 42 is incorporated in the proximal end portion 39, when the body 32 is elastically deformed in a stretching manner toward the second axial end 30b in the process of mounting the tire valve unit 10 on the wheel 11, the attaching member 41, which is incorporated in the proximal end portion 39, and the sensor unit 20, which is secured to the attaching member 41, move in accordance with the deformation.

Since the engaging portion 38, which is a portion having an outer diameter greater than the diameter of the mounting hole 14, is stretched toward the second axial end 30b in the process of mounting the tire valve unit 10 on the wheel 11, one might consider incorporating the support portion 42 of the attaching member 41 in the engaging portion 38. However, in a state in which the tire valve unit 10 is mounted on the wheel 11, the engaging portion 38 has passed through the mounting hole 14 of the wheel 11 and is located outside the tire 13. When the engaging portion 38 has passed through the mounting hole 14 in the process of mounting the tire valve unit 10 on the wheel 11, the engaging portion 38 no longer receives force toward the second axial end 30b and is no longer stretched toward the second axial end 30b. Thus, although part of the body 32 closer to the second axial end 30b than the engaging portion 38 is stretched toward the second axial end 30b, the attaching member 41 may be unable to move accordingly. The attaching portion, which includes the mounting portion 37 and the proximal end portion 39, does not pass through the mounting hole 14 (does not move to the outside of the mounting hole 14) when the tire valve unit 10 is mounted on the wheel 11 and is easily stretched toward the second axial end 30b in the process of press-fitting the tire valve 30 into the mounting hole 14. The attaching portion and the attaching member 41 move integrally by providing the support portion 42 in the proximal end portion 39.

The above-described embodiment achieves the following advantages.

(1) Since the support portion 42 of the attaching member 41 is incorporated in the proximal end portion 39, the attaching member 41 and the sensor unit 20 move according to the elastic deformation of the proximal end portion 39 in the process of mounting the tire valve unit 10 on the wheel 11. Since the sensor unit 20 moves according to elastic deformation of the proximal end portion 39, the sensor unit 20 is restrained from preventing the elastic deformation of the proximal end portion 39. As a result, the sensor unit 20 and the body 32 may be provided close to each other in the axial direction so that the center of gravity of the tire valve unit 10 is located close to the mounting portion 37. This structure reduces stress generated on the body 32 when centrifugal force is applied to the tire valve unit 10 by rotation of the wheel 11, thus retarding deterioration of the body 32.

(2) The fixture 51 is fitted into the grooves 44 provided on the attaching projections 43 to secure the sensor unit 20 and the valve stem 31 to each other. Thus, the sensor unit 20 and the valve stem 31 are easily secured to each other. Furthermore, the fixture 51 is attached without the need for a tool.

Second Embodiment

A tire valve unit 10 according to a second embodiment will now be described. In the following description, like or the same reference numerals are given to those components that are like or the same as the corresponding components of the first embodiment and detailed explanations are omitted.

Figure 6:
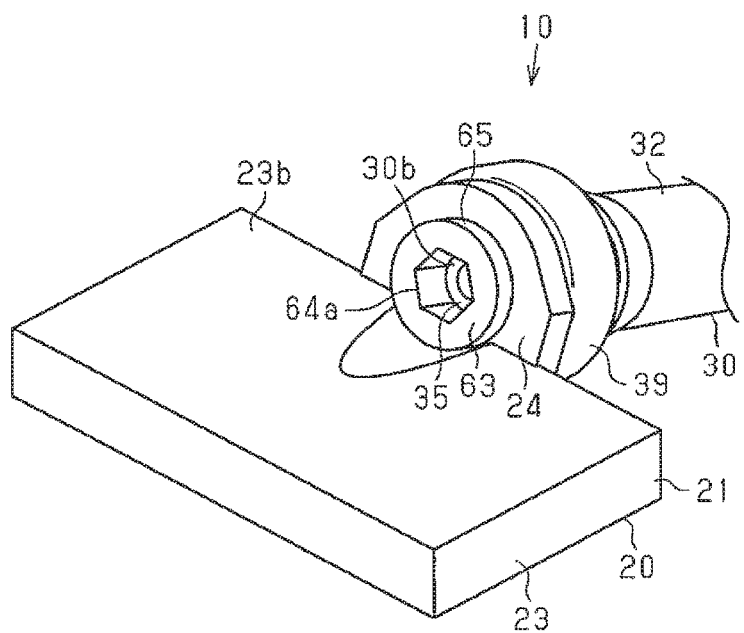
FIG. 6 is an enlarged perspective view of a second axial end of a tire valve unit according to a second embodiment.
Figure 7:
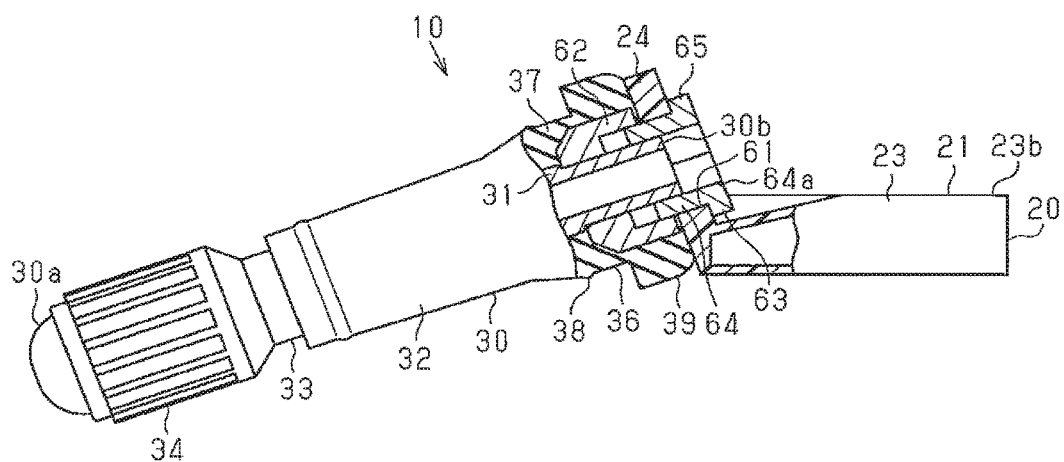
FIG. 7 is a partially cut-away view of the tire valve unit according to the second embodiment.

As shown in FIGS. 6 and 7, the attaching wall 24 of the present embodiment includes a single through-hole 61 that extends in the thickness direction.

A first threaded member 62 is incorporated in the body 32 of the tire valve 30. The first threaded member 62 is arranged to extend in the axial direction of the tire valve 30 across the boundary between the mounting portion 37 and the proximal end portion 39. The first threaded member 62 is cylindrical and has an internal thread on its inner circumferential surface.

The first threaded member 62 is coaxial with the valve stem 31, and the valve stem 31 extends through the center of the first threaded member 62. The body 32 (rubber) is not located between the outer circumferential surface of the valve stem 31 and the inner circumferential surface of the first threaded member 62, and the internal thread is exposed in the space between the outer circumferential surface of the valve stem 31 and the inner circumferential surface of the first threaded member 62.

The tire valve unit 10 includes a second threaded member 63, and the second threaded member 63 is screwed to the first threaded member 62 to secure the sensor unit 20 to the tire valve 30. The second threaded member 63 includes a cylindrical shaft 64, which has an external thread on its outer circumferential surface, and a flange 65, which is located on a first end 64a of the shaft 64. At least the first end 64a of the hole located on the inner circumference of the shaft 64 is hexagonal.

The shaft 64 of the second threaded member 63 is inserted in the through-hole 61 and screwed to the first threaded member 62. The proximal end portion 39 and the flange 65 sandwich the attaching wall 24, thus securing the sensor unit 20 to the tire valve 30. The body 32 (the proximal end portion 39) is in close contact with the attaching wall 24.

The above-described embodiment achieves the following advantages.

(3) The first threaded member 62 is arranged to extend across the boundary between the mounting portion 37 and the proximal end portion 39. Although the first threaded member 62 extends across the boundary between the mounting portion 37 and the proximal end portion 39, when the body 32 is elastically deformed in a stretching manner toward the second axial end 30b in the process of mounting the tire valve unit 10 on the wheel 11, the first threaded member 62 moves toward the second axial end 30b according to the deformation in the same manner as in the first embodiment. Since the sensor unit 20 moves integrally with the first threaded member 62, the gap between the sensor unit 20 and the body 32 is reduced as in the first embodiment.

(4) The sensor unit 20 may be removed from the wheel 11 due to a fault in the sensor 22 or low remaining battery level. In such a circumstance, if an external thread that is integrally formed with the housing 21 is screwed to the first threaded member 62, the housing 21 itself needs to be rotated to remove the sensor unit 20 from the first threaded member 62. However, since rotation of the housing 21 is prevented by the abutment with the wheel 11, the housing 21 cannot be rotated. Thus, the sensor unit 20 cannot be removed from the tire valve 30 with the tire valve 30 mounted on the wheel 11. The housing of the sensor unit 20 may be shaped such that rotation of the sensor unit 20 is not prevented by the wheel 11, but this would raise issues related to the balance between the housing and the sensor 22 accommodated in the housing or issues related to the structure for attaching the sensor unit 20 to the tire valve 30.

In the present embodiment, since the second threaded member 63, which is a separate body from the housing 21, secures the sensor unit 20 to the tire valve 30, only the second threaded member 63 needs to be rotated to remove the sensor unit 20 from the tire valve 30. Thus, only the sensor unit 20 can be removed with the tire valve 30 mounted on the wheel 11.

The embodiments may be modified as follows.

The shape of the fixture 51 of the first embodiment may be changed. For example, as shown in a modification of FIG. 8, a fixture 71 may be U-shaped. The fixture 71 includes two long thin arms 72, 73, and the distal ends of the arms 72, 73 are separate from each other. The arms 72, 73 are elastically deformable such that the distal ends separate from each other. The arms 72, 73 of the fixture 71 are fitted into the grooves 44 of the attaching projections 43. To fit the fixture 71 to the grooves 44 of the attaching projections 43, the fixture 71 is shifted from one of the attaching projections 43 toward the other with the distal ends of the arms 72, 73 located on the leading end. The arms 72, 73 are shifted from one of the attaching projections 43 to the other while the arms 72, 73 are pushed and spread by the outer circumferential surface of each groove 44 to be fitted into the grooves 44.

The fixture 51 of the first embodiment does not necessarily have to be a member fitted into the grooves 44. For example, an external thread may be provided on the outer circumferential surface of each attaching projection 43, and a nut that serves as the fixture may be attached to each attaching projection 43 inserted in the associated attaching hole 26. The fixture 51 may also be formed integrally with the housing 21. For example, an elastically deformable annular fixture may be embedded in the attaching wall 24, and the attaching projections 43 may be inserted in the fixture so that the fixture is fitted into the grooves 44.

Figure 9:
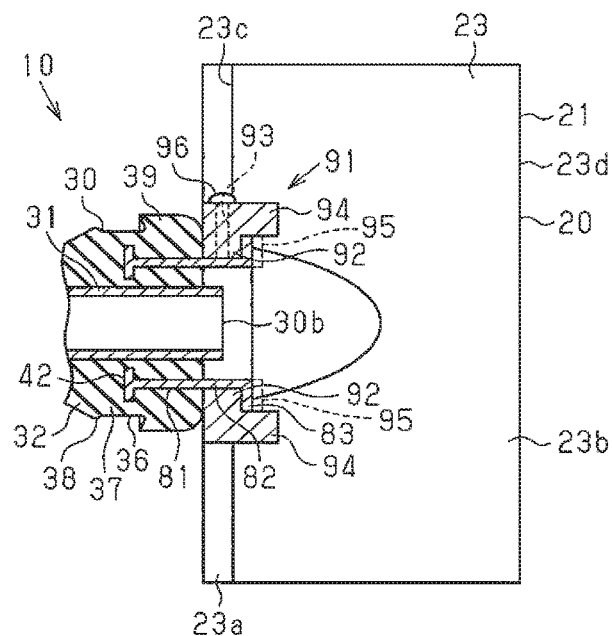
FIG. 9 is a cross-sectional view of a second axial end of a tire valve unit according to a further modification.
Figure 10:
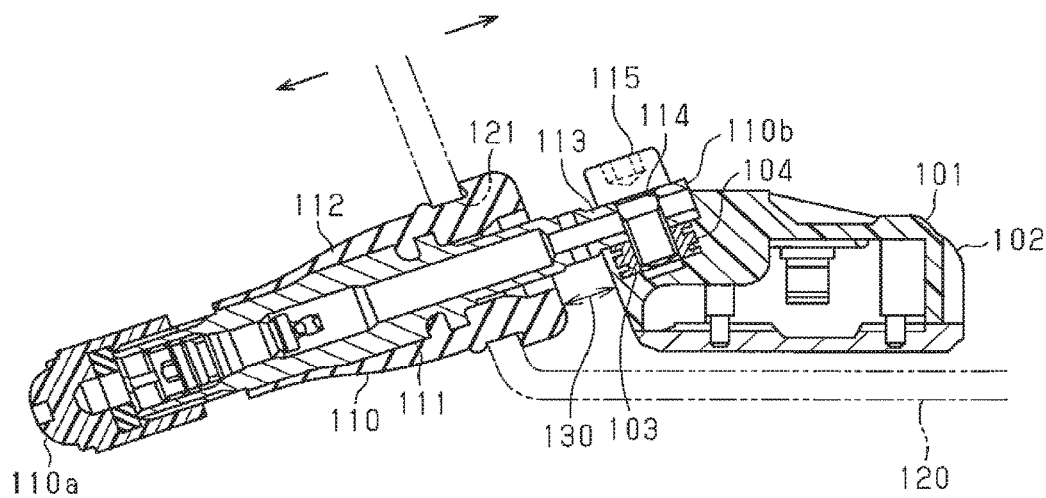
FIG. 10 is a cross-sectional view of a conventional tire valve unit.

The shape of the attaching projections 43 and the attaching wall 24 of the housing 21 according to the first embodiment may be changed. For example, as shown in the modification of FIG. 9, an attaching projection 81 may include a cylindrical main body 82, which extends from the support portion 42, and a flange 83, which is provided on the main body 82. An attaching wall 91 of the housing 21 includes two arcuate first walls 92, which extend from the housing 21 to include one of the four sides of the outer surface 23b that is a long side, or a side 23c. In this example, the first walls 92 extend from two outer surfaces 23a, 23b and are formed at the corner of the housing 21 where the outer surfaces 23a, 23b meet. Instead of this example, if the first walls 92 are formed to include the above-mentioned long side 23c, the first walls 92 may extend from only the outer surface 23a, or may extend from only the outer surface 23b. The two first walls 92 are separate from each other along the side 23c, and the separated distance is greater than the outer diameter of the main body 82 and less than the outer diameter of the flange 83. One of the two first walls 92 includes a threaded hole 93, which extends through the associated first wall 92 in a direction in which the side 23c extends. The attaching wall 91 includes two second walls 94, which are integrally formed with the first walls 92, and the second walls 94 extend from the first walls 92 in the direction toward a side 23d opposite to the side 23c of the outer surface 23b. The two second walls 94 are separate from each other along the side 23c, and the separated distance is greater than the outer diameter of the flange 83. Furthermore, the attaching wall 91 includes two third walls 95, which prevent the movement of the flange 83 in the radial direction.

The main body 82 of the attaching projection 81 is located between the first walls 92, and the flange 83 is located between the second walls 94. A screw 96 that is inserted in the threaded hole 93 is pressed against the outer circumferential surface of the main body 82. The screw 96 prevents the movement of the tire valve 30 in the axial direction, and the third walls 95 abut against the flange 83 to prevent the movement of the tire valve 30 in the radial direction.

Figure 8:
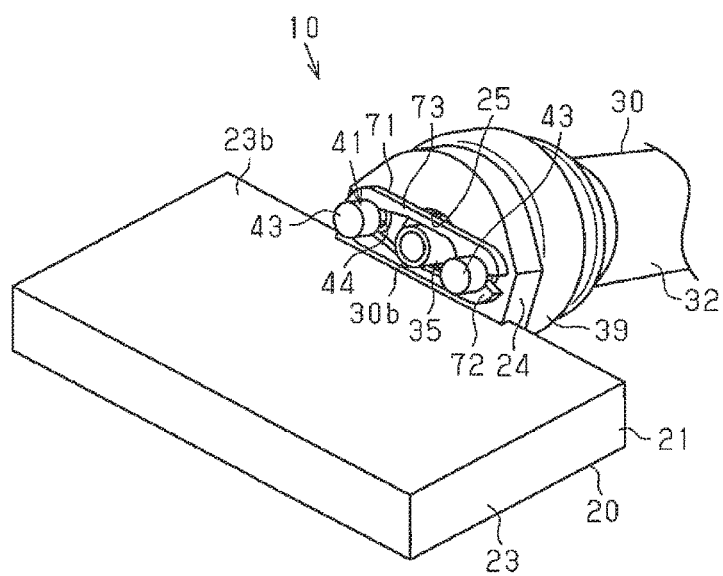
FIG. 8 is an enlarged perspective view of a second axial end of a tire valve unit according to a modification.

In the above-described embodiments and the modification of FIG. 8, the valve stem 31 does not necessarily have to project from the proximal end portion 39 (does not necessarily have to include the second projection 35). In this case, the attaching wall 24 does not necessarily have to include the through-hole 61.

The number of the attaching projections 43 of the first embodiment may be changed. In this case, the number of the attaching holes 26 is changed in accordance with the number of the attaching projections 43.

The support portion 42 according to the first embodiment and the modification of FIG. 8 may be shaped as required as long as the attaching member 41 can be secured to the body 32.

In each of the above-described embodiments and the modifications, the shape of the housing 21 may be changed as required.

In the second embodiment, the first threaded member 62 may include an external thread on its outer circumferential surface, and the second threaded member 63 may include an internal thread on its inner circumferential surface.

The support portion 42 of the first embodiment and the modifications may be incorporated in any position in the attaching portion. The support portion 42 may be incorporated in the mounting portion 37, or may extend across the boundary between the mounting portion 37 and the proximal end portion 39. Similarly, the first threaded member 62 of the second embodiment may be incorporated in the mounting portion 37, or may be incorporated in the proximal end portion 39.

In each of the above-described embodiments and the modifications, the body 32 and the sensor unit 20 do not necessarily have to be in close contact with each other, and a slight gap may be provided between the body 32 and the sensor unit 20.

A technical idea obtainable from the above embodiments and modifications other than those disclosed in the claim section are described below with their advantages.

(A) A tire valve unit comprising:

a tire valve including a valve stem and a rubber body located on a periphery of the valve stem, the tire valve including a first axial end and a second axial end; and a sensor unit including a sensor that detects a condition of a tire mounted on a wheel and a housing that accommodates the sensor, and the sensor unit is secured to the tire valve, wherein the tire valve unit is mounted on the wheel by press-fitting the tire valve into a mounting hole in the wheel from the first axial end, the body includes an attaching portion that is located closer to the second axial end of the tire valve than the portion located outside the tire with the tire valve unit mounted on the wheel, the tire valve includes an attaching projection that projects from the inside of the attaching portion toward the outside of the attaching portion in the axial direction of the tire valve, and the tire valve unit further includes a fixture that secures the attaching projection to the housing.

DESCRIPTION OF THE REFERENCE NUMERALS

10 . . . tire valve unit, 11 . . . wheel, 13 . . . tire, 14 . . . mounting hole, 20 . . . sensor unit, 21 . . . housing, 22 . . . sensor, 24 . . . attaching wall, 26 . . . attaching hole, 30a . . . first axial end, 30b . . . second axial end, 31 . . . valve stem, 32 . . . body, 37 . . . mounting portion, 39 . . . proximal end portion, 41 . . . attaching member, 42 . . . attaching projection, 44 . . . groove, 51 . . . fixture, 62 . . . first threaded member, 63 . . . second threaded member.

What is claimed is:

1. A tire valve unit comprising:
a tire valve including a valve stem and a rubber body located on a periphery of the valve stem, the tire valve including a first axial end and a second axial end; and
a sensor unit including a sensor that detects a condition of a tire mounted on a wheel and a housing that accommodates the sensor, and the sensor unit is secured to the tire valve, wherein
the tire valve unit is mounted on the wheel by press-fitting the tire valve into a mounting hole in the wheel from the first axial end,
the body includes
an opposed portion that is opposed to an inner surface of the mounting hole with the tire valve unit mounted on the wheel,
a proximal end portion located closer to the second axial end of the tire valve than the opposed portion, and
an attaching portion including the opposed portion and the proximal end portion,
the tire valve includes a first threaded member incorporated in the attaching portion,
the first threaded member and the valve stem are separate members, and
the tire valve unit further includes a second threaded member that is inserted in a through-hole in the housing and is screwed to the first threaded member.

2. The tire valve unit according to claim 1, wherein the first threaded member is cylindrical and the valve stem extends through the first threaded member.

3. A tire valve unit comprising:
a tire valve including a valve stem and a rubber body located on a periphery of the valve stem, the tire valve including a first axial end and a second axial end; and
a sensor unit including a sensor that detects a condition of a tire mounted on a wheel and a housing that accommodates the sensor, and the sensor unit is secured to the tire valve, wherein
the tire valve unit is mounted on the wheel by press-fitting the tire valve into a mounting hole in the wheel from the first axial end,
the body includes an attaching portion that is located closer to the second axial end of the tire valve than the portion located outside the tire with the tire valve unit mounted on the wheel,
the tire valve includes
a supporting portion that is incorporated in the attaching portion, and
an attaching projection that extends from the support portion in the axial direction of the tire valve to project from the inside of the attaching portion toward the outside of the attaching portion,
the supporting portion is annular and the valve stem extends through the support portion, and
the tire valve unit further includes a retaining ring that secures the attaching projection to the housing.

4. The tire valve unit according to claim 3, wherein
the housing includes an attaching wall including an attaching hole,
the attaching projection is inserted through the attaching hole and includes a groove at a part of the attaching projection that projects from the attaching wall, and
the retaining ring is fitted to the groove.

5. The tire valve unit according to claim 3, wherein the attaching projection is integrally formed with the supporting portion.

* * * * *